(12) United States Patent
Haseltine et al.

(10) Patent No.: US 10,593,102 B2
(45) Date of Patent: Mar. 17, 2020

(54) THREE-DIMENSIONAL DISPLAY FOR SMART HOME DEVICE

(71) Applicant: Disney Enterprises, Inc., Burbank, CA (US)

(72) Inventors: Eric C. Haseltine, Silver Spring, MD (US); Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 63 days.

(21) Appl. No.: 15/894,751

(22) Filed: Feb. 12, 2018

(65) Prior Publication Data

US 2019/0251739 A1    Aug. 15, 2019

(51) Int. Cl.
*G06T 15/50* (2011.01)
*G06T 5/00* (2006.01)
*G02B 27/22* (2018.01)
*H04R 1/02* (2006.01)
*H04R 1/34* (2006.01)
*G02B 27/24* (2006.01)

(52) U.S. Cl.
CPC .......... *G06T 15/50* (2013.01); *G02B 27/2214* (2013.01); *G02B 27/2242* (2013.01); *G02B 27/2292* (2013.01); *G02B 27/24* (2013.01); *G06T 5/006* (2013.01); *H04R 1/028* (2013.01); *H04R 1/345* (2013.01); *G06T 2200/04* (2013.01)

(58) Field of Classification Search
None
See application file for complete search history.

(56) References Cited

U.S. PATENT DOCUMENTS

| 2011/0037952 | A1 | 2/2011 | LaDuke et al. | |
| 2012/0313839 | A1 | 12/2012 | Smithwick et al. | |
| 2015/0163573 | A1* | 6/2015 | O'Neal | H04R 1/2842 181/155 |
| 2017/0094156 | A1* | 3/2017 | Kim | G06F 3/013 |
| 2017/0277176 | A1* | 9/2017 | Hutson | G05D 1/0016 |

* cited by examiner

*Primary Examiner* — Michelle Chin
(74) *Attorney, Agent, or Firm* — Patterson + Sheridan, LLP

(57) ABSTRACT

A presentation device for use with a computing device including a display device and an audio output. The presentation device includes a body member defining an interior volume and at least a first opening. The body member further includes a partially reflective and partially transmissive medium. The body member is configured to receive anamorphically-distorted imagery that is displayed by the display device, which has a predefined arrangement with the body member. The body member is further configured to reconstitute the anamorphically-distorted imagery as a three-dimensional illusion that appears within the interior volume. The body member is further configured to guide audio from the audio output to exit the body member through the first opening.

20 Claims, 11 Drawing Sheets

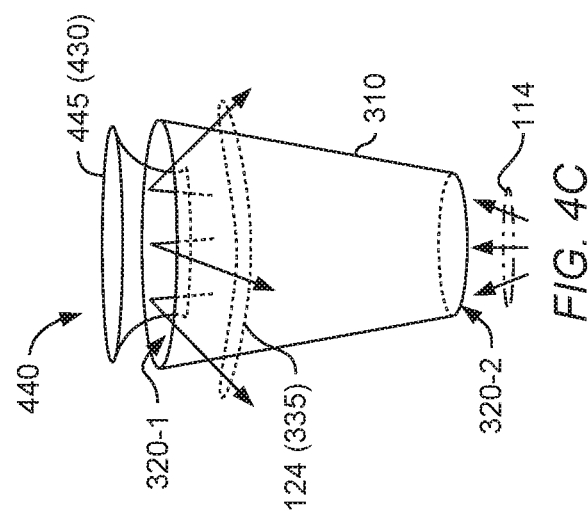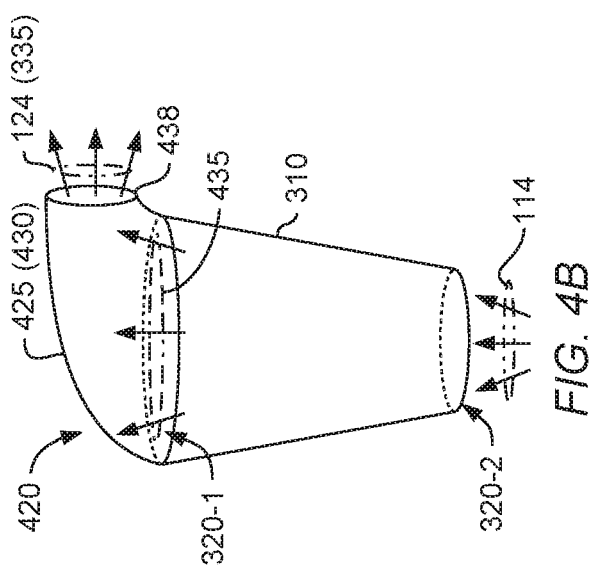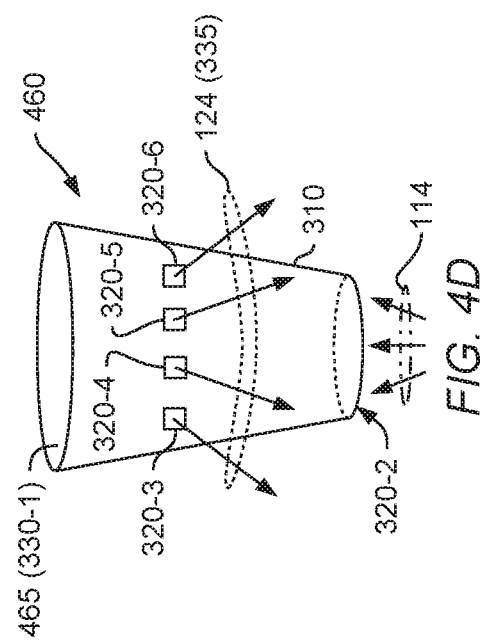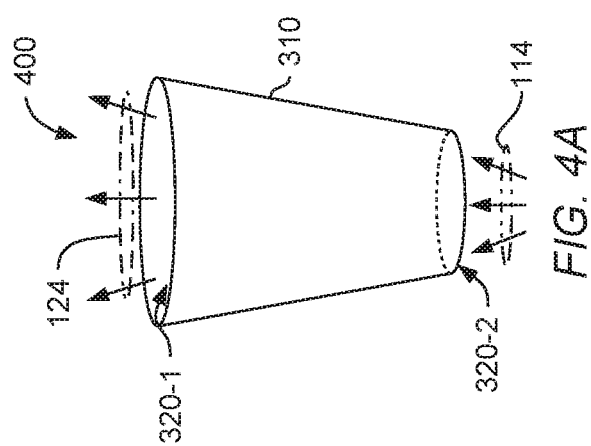

US 10,593,102 B2

THREE-DIMENSIONAL DISPLAY FOR SMART HOME DEVICE

BACKGROUND

Field of the Disclosure

The present disclosure generally relates to techniques and devices for producing a three-dimensional illusion using imagery displayed by a display device.

Description of the Related Art

Anamorphosis is an image projection technique involving the reconstitution of a distorted projection. An anamorphically-distorted source image may appear distorted from one vantage point, but may appear undistorted from a different vantage point. For example, an anamorphically-distorted source image may appear distorted when viewed directly, but may appear undistorted after being reflected by a particular mirror.

Portable computing devices, like smart phones and tablets, have evolved to display high resolution images to users. These devices typically display two-dimensional photographs and video images reflecting the real world, and/or computer-generated characters. As these displays have evolved, it has become desirable to display imagery in three-dimensions to improve user experience through enhanced realism. Three-dimensional images can be useful for electronic video games, interactive applications, video chat applications, or any other application involving the display of images or characters.

SUMMARY

An embodiment described herein is a presentation device for use with a computing device including a display device and an audio output, the presentation device including a body member defining an interior volume and at least a first opening, the body member including a partially reflective and partially transmissive medium. The body member is configured to receive anamorphically-distorted imagery that is displayed by the display device. The display device has a predefined arrangement with the body member. The body member is further configured to reconstitute the anamorphically-distorted imagery as a three-dimensional illusion that appears within the interior volume. The body member is further configured to guide audio from the audio output to exit the body member through the first opening.

An embodiment described herein is a presentation device for use with a mobile computing device, the presentation device including a body member having a predefined arrangement with a reference surface, the body member defining an interior volume, the body member including a partially reflective and partially transmissive medium. The body member is configured to receive, when the mobile computing device has a predefined arrangement with the reference surface, anamorphically-distorted imagery that is displayed by a display device of the mobile computing device. The body member is further configured to reconstitute the anamorphically-distorted imagery as a three-dimensional illusion that appears within the interior volume An embodiment described herein is a presentation device including a display device configured to display anamorphically-distorted imagery. The presentation device further including a body member having a predefined arrangement with the display device, the body member defining an interior volume and a first opening, the body member including a partially reflective and partially transmissive medium. The body member is configured to, using the anamorphically-distorted imagery, display a three-dimensional illusion appearing within the interior volume. The body member is further configured to guide audio from an audio device through the first opening.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIGS. 4A-4D illustrate exemplary implementations for directing audio through one or more openings in the body member, according to one or more embodiments.

DETAILED DESCRIPTION

Figure 1:
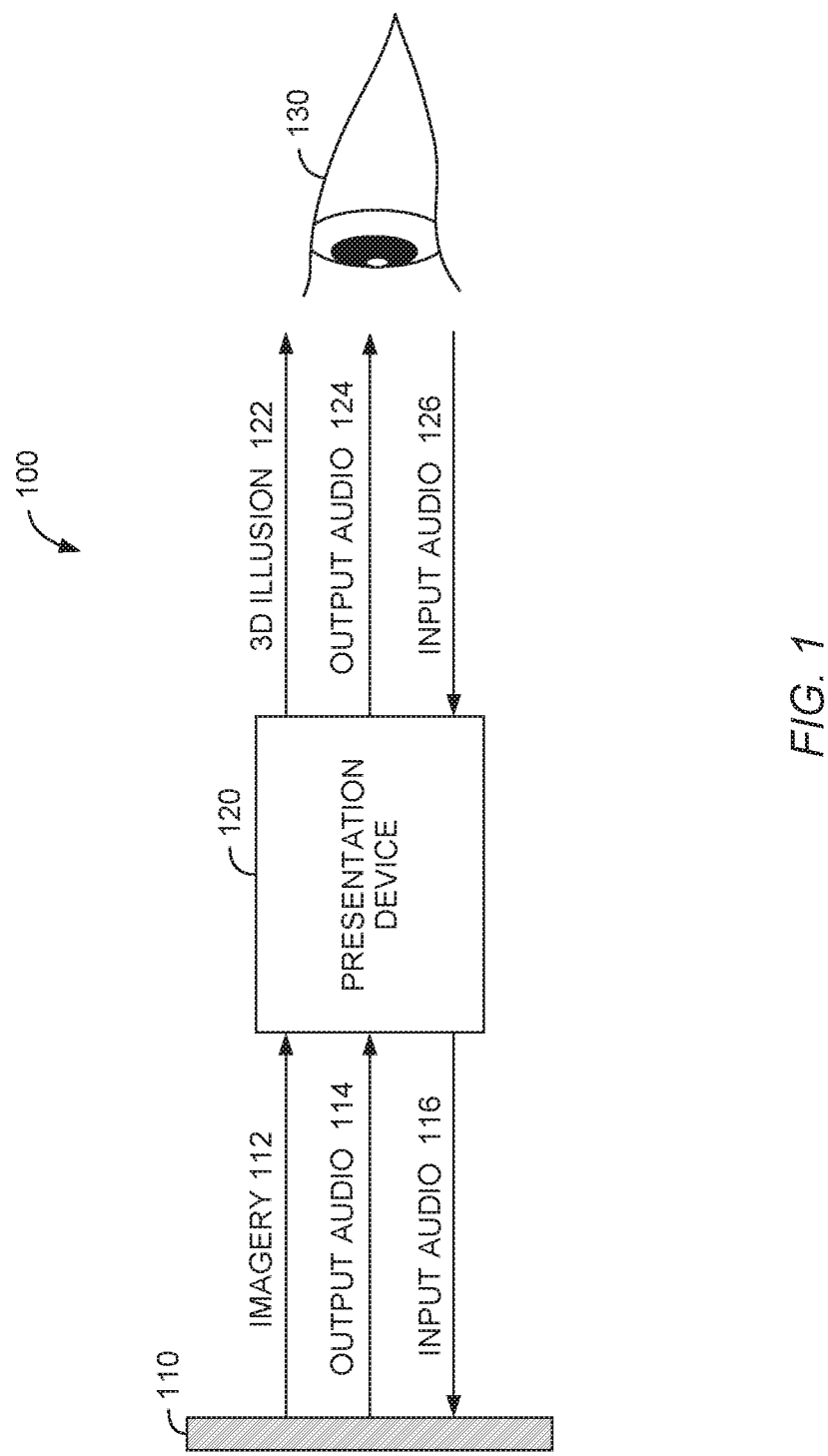
FIG. 1 illustrates a system for providing a three-dimensional illusion of displayed imagery to a user, according to one or more embodiments.

Generating an illusion of three-dimensional (3D) imagery can be achieved in a variety of ways. For example, the Pepper's ghost illusion involves the appearance of a three-dimensional object in a location where the object is not physically present. Pepper's ghost can be used by magicians, ride or attraction designers, and others to produce a 3D illusion of a latent or ghost-like image. Using plate glass and lighting techniques, Pepper's ghost systems can make objects appear and disappear within a scene or room. These systems can include a main room or scene that is readily viewed by a guest or viewer and a hidden room that is not visible to the viewer. The rooms may be identical in their physical structure, including furniture and other objects, except the hidden room may include additional objects or characters. A large piece of glass or a half-silvered mirror is situated between the viewer and the scene at an angle. When the main room is lit and the hidden room is darkened, the viewer only sees the main room as the hidden room does not reflect from the glass. Pepper's ghost then becomes visible to the viewer when the hidden room is lit.

In general, these images can only be viewed from a relatively narrow field of regard. As used herein, the term "field of view" describes how big an image appears to the eye of the user. The term "field of regard" describes the number (or range) of different angles from which an image can be viewed. When the field of regard is relatively narrow, images can only be viewed when users are stationed at a particular viewing location or angle.

It is therefore desirable to generate a three-dimensional illusion with a much broader field of regard, which in some cases can approach 360 degrees. For example, for imagery displayed on a tablet or smart phone, it may be beneficial to generate the three-dimensional illusion with a broad field of regard to encourage social viewing by multiple users in a room. Further, one can provide an interactive system providing audio for the broader field of regard associated with the three-dimensional illusion.

As one example, a tablet or smart phone can generate the image of a popular character from a movie, television show, book, video game, or the like. The tablet or smart phone can include image generation and distortion components to generate an anamorphically-distorted image of the character. When viewed using a presentation device according to various embodiments described herein, the character would appear undistorted and visible from a nearly 360 degree viewing angle.

The tablet or smart phone can also include audio accompanying the generated imagery. For example, the tablet or smart phone can include speakers to transmit audio output to a user, and a microphone to receive audio input from a user. In some embodiments, the presentation device used to generate the three-dimensional illusion can also be configured to guide the audio from the speakers of the smart phone or tablet to a user, and/or to guide audio from a user to the microphone of the smart phone or tablet. This can be used to enhance a variety of different applications, including interactive applications, video chat applications, and others. The presentation device can also enhance the output and/or input of localized audio, such as a voice, over background noise. This can be achieved through the waveguide properties of the presentation device, or through a separate microphone, speakers, and/or processor included in the presentation device.

FIG. 1 illustrates a system 100 for providing a three-dimensional illusion of displayed imagery to a user. A user device 110 displays imagery 112 from a typically two-dimensional display surface. The user device 110 will be discussed in more detail with regard to FIG. 2. Some non-limiting examples of the user device 110 include a smart phone, tablet, personal computer, or any other suitable device having a display. The imagery 112 displayed by the user device 110 can be a computer-generated image, for example an image of a character from a movie or television show, and/or an image of a person or real object, for example an image of a person in a video conference.

An audio-visual presentation device 120 (also referred to herein as presentation device 120) is used to generate a three-dimensional illusion 122 corresponding to the imagery 112 received from the user device 110. For example, the presentation device 120 can include a variety of optical components, including lenses, mirrors, and other suitable optical components. FIGS. 3-6 describe several examples of optical configurations suitable for use in the presentation device 120. A user 130 can view the three-dimensional illusion 112 generated using the user device 110 and the presentation device 120. In one embodiment, the three-dimensional illusion 112 can be viewed from a wide field of regard, in some cases approaching 360 degrees around the presentation device 120.

In some embodiments, the presentation device 120 can also include components related to audio presentation. For example, the presentation device 120 may be configured to act as a waveguide and direct output audio 114 from a speaker in the user device 110 as output audio 124 to the user 130. The presentation device 120 may be further configured to direct input audio 126 from the user 130 as input audio 116 to a microphone in the user device 110. In some embodiments, the presentation device 120 may include electronic components related to audio, including microphones, speakers, and the like. For example, these electronic components can be configured to connect with the user device 110 wirelessly, through Bluetooth™ or any other suitable wireless technology. The electronic components can also be configured to connect with the user device 110 through a wired application, through a direct connection like a docking station, or through a microphone picking up output audio 114 from the user device. The directed audio supported by the presentation device 120 can improve audio quality and thereby enhance interactive applications.

Figure 2:
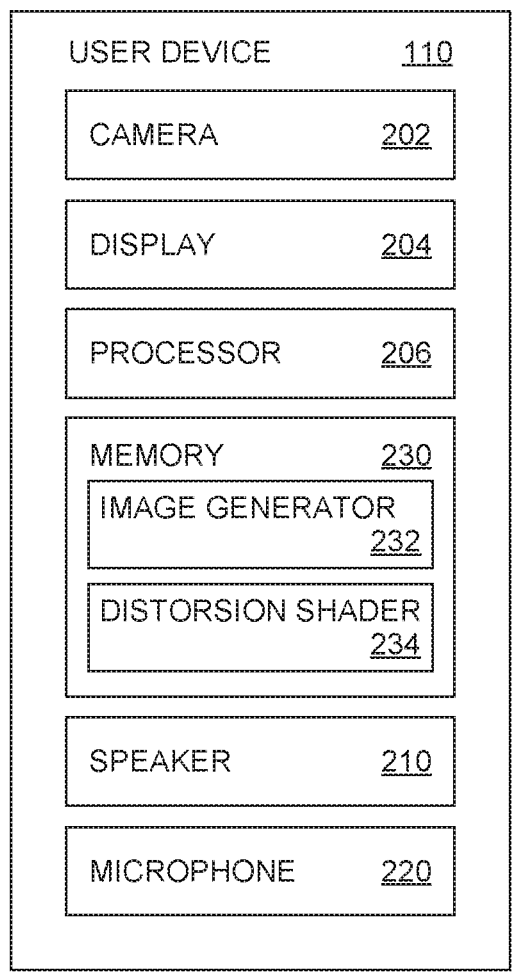
FIG. 2 illustrates an exemplary user device, according to one or more embodiments.

FIG. 2 illustrates an exemplary user device 200, according to one embodiment. The user device 200 may be used in conjunction with other embodiments discussed herein. For example, the user device 200 represents one possible implementation of the user device 110 described with respect to FIG. 1. The user device 200 may be implemented as a smartphone, tablet, personal computer, or any other suitable device. The user device 200 includes a camera 202. The camera 202 can be configured to sense visible light and/or infrared light. Alternatively, the camera 202 can be any other form of suitable visual sensor. The user device 200 further includes a display 204. The display 204 may include any type of dynamic display capable of displaying imagery to a user using any suitable display technology, whether known or later developed. Some non-limiting examples of known display technologies include light emitting diode (LED), organic LED (OLED), cathode ray tube (CRT), liquid crystal display (LCD), plasma, and electroluminescence (EL).

The user device 200 further includes a processor 206 which generally retrieves and executes programming instructions stored in the memory 230. The processor 206 is included to be representative of a single central processing unit (CPU), multiple CPUs, a single CPU having multiple processing cores, graphics processing units (GPUs) having multiple execution paths, and the like. The memory 230 is generally included to be representative of electronic storage of any suitable type(s), including random access memory and/or non-volatile storage.

The memory 230 generally includes program code for performing various functions. The program code is generally described as various functional "applications" or "modules" within the memory 230, although alternate implementations may have different functions and/or combinations of functions. Within the memory 230, an image generator module 232 (or "image generator 232") is used to generate imagery. This imagery may be undistorted, such that it can be viewed directly on the display 204 without appearing distorted.

A distortion shader module 234 (or "distortion shader 234") can also be used to distort the imagery generated by the image generator 232. In some embodiments, the distortion shader 234 is configured to distort the imagery to create anamorphically-distorted imagery that appears distorted when viewed by the user at the display 204, but appears undistorted when viewed through appropriate optical components, such as the presentation device 120 described in FIG. 1. The image generator 232 and distortion shader 234 can be configured to generate the image, and distort it appropriately, in real-time. The real-time processing facilitates interactive communication between a user and another device (e.g., in a video-conference) and interactive communication between a user and a computer-generated component (e.g., a fictional character).

The user device 110 can further include audio components, including a speaker 210 and a microphone 220. The speaker 210 can be used to output audio, and is representative of a single speaker, a combination of multiple speakers, or any suitable audio output device. The microphone 220 can be used to input audio, and is representative of a single microphone, a combination of multiple microphones, or any suitable audio input device.

Figure 3:
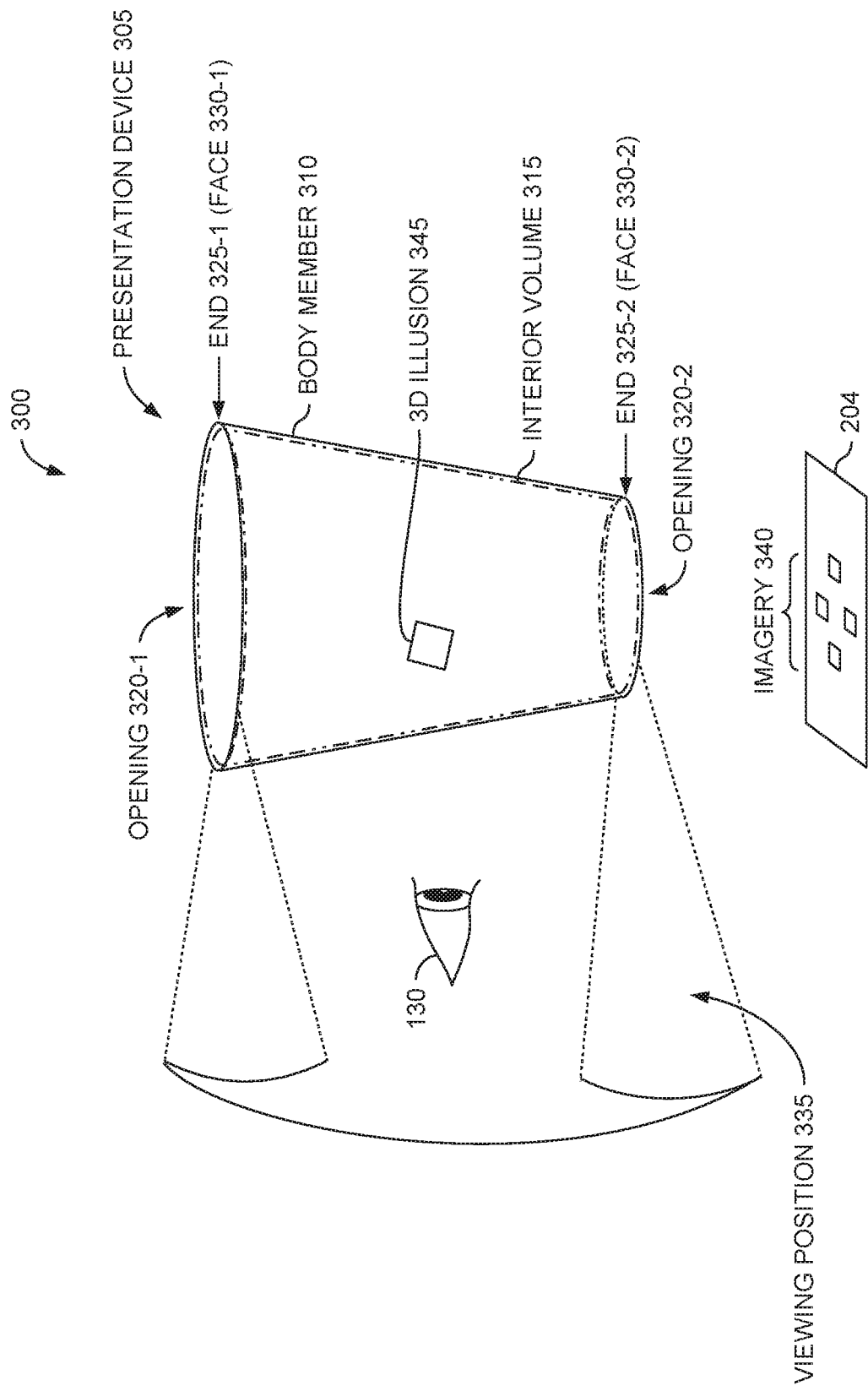
FIG. 3 illustrates an exemplary system for providing a three-dimensional illusion of display imagery to a user, according to one or more embodiments.

FIG. 3 illustrates an exemplary system 300 for providing a three-dimensional illusion of display imagery to a user. The system 300 may be used in conjunction with other embodiments described herein, such as receiving imagery from a user device 110 described in FIGS. 1 and 2.

The system 300 comprises a presentation device 305 that is visually coupled with a display 204. The presentation device 305 comprises a body member 310 that defines an interior volume 315. More specifically, the interior volume 315 of the body member 310 extends between the surface(s) of the body member 310 and between the ends 325-1, 325-2 of the body member 310. When the body member 310 is in a predefined arrangement with the display 204, the body member 310 is configured to receive imagery 340 displayed by the display 204 (e.g., anamorphically-distorted imagery) and to reconstitute the imagery 340 to produce a substantially undistorted three-dimensional illusion 345 that appears within the interior volume 315. In some cases, the three-dimensional illusion 345 has the appearance of "floating" within the interior volume 315.

The body member 310 comprises a partially reflective and partially transmissive medium. Stated another way, the body member 310 is formed such that imagery 340 directed into the interior volume 315 is reflected by interior surface(s) of the body member 310 to form the three-dimensional illusion 345, while a user 130 may view through the exterior surface of the body member 310 into the interior volume 315 to view the three-dimensional illusion 345. In some embodiments, the reflective and transmissive properties of the body member 310 use Fresnel reflection to produce the three-dimensional illusion 345. The body member 310 may comprise any material(s) having suitable characteristics for reflecting and transmitting incident light. For example, the body member 310 may comprise a plastic, glass, or other partially transmissive material.

In some embodiments, the body member 310 has a shape that is substantially cylindrical or substantially conical. As used herein, "substantially cylindrical" and "substantially conical" shapes are intended to include truncated shapes (such as a frustoconical shape), as well as shapes having a portion that is substantially cylindrical or substantially conical. For example, the body member 310 may have an irregular overall shape, but includes a substantially cylindrical or substantially conical portion within which the imagery 340 is received and reflected to produce the three-dimensional illusion 345.

In some embodiments, the body member 310 defines one or more openings through which audio may enter and/or exit the interior volume 315. In some embodiments, the imagery 340 may be directed through one or more of the openings into the interior volume 315. As shown, the body member 310 defines a first opening 320-1 at a first end 325-1 of the body member 310, and further defines a second opening 320-2 at a second end 325-2 opposite the first end 325-1. Several examples of alternate implementations are discussed below with respect to FIG. 4. In some cases, the first end 325-1 and the second end 325-2 may correspond to a long axis of the body member 310. In some cases, the first end 325-1 and the second end 325-2 may each correspond to a face of the body member 310, such as a substantially circular face or a substantially elliptical face. Alternate implementations of the body member 310 may define greater or fewer numbers of openings. Other locations of the openings are also possible, consistent with the ability of the body member 310 to suitably produce the three-dimensional illusion 345.

In some cases, a single source image included in the imagery 340 may produce the three-dimensional illusion 345 with a relatively wide field of regard. The field of regard corresponding to a particular source image is illustrated as a predefined viewing position 335 for the user 130. However, an even wider field of regard may be obtained for the presentation device 305 by displaying multiple source images in the imagery 340. Using the example of FIG. 3, the imagery 340 comprises four source images having different orientations. Each of the four source images may be anamorphically distorted. The body member 310 reflects the four source images as four 3D illusions 345 having four predefined viewing positions 335 distributed around the presentation device 305, which corresponds to a wider field of regard.

In some embodiments, the display 204 is configured to distort the source images included in imagery 340 (e.g., using the distortion shader 234 of user device 110) to be optimized for the corresponding predefined viewing positions 335. In another embodiment, a camera 202 included in the user device 100 may be used to detect the locations of one or more users, and the display 204 may distort the source images to be optimized for the detected locations. In this way, the three-dimensional illusions 345 may appear more clearly for the one or more users in their current location relative to the body member 310.

FIGS. 4A-4D illustrate exemplary implementations for directing audio through one or more openings in the body member 310, according to one or more embodiments. The implementations may be used in conjunction with other embodiments discussed herein; for example, the body member 310 may be configured to direct audio while displaying three-dimensional illusions within the interior volume, as described with respect to FIG. 3.

In the presentation device 400, the body member 310 defines a first opening 320-1 and a second opening 320-2. Output audio 114 is received through the second opening 320-2, propagates through the body member 310, and exits as output audio 124 through the first opening 320-1.

The presentation device 420 comprises an audio directing member 430 (more specifically, a curved audio waveguide 425) disposed at the first opening 320-1 and configured to reorient and guide output audio 435 through an opening 438 defined by the curved audio waveguide 425. The output audio 124 exiting the curved audio waveguide 425 may thus be directed to a desired position, such as a predefined viewing position 335.

The curved audio waveguide 425 may comprise any suitable material, including plastic, glass, metal, and the like. In some embodiments, the curved audio waveguide 425 is a separate element from the body member 310 and removably or rigidly connected with the body member 310 through any suitable means. In other embodiments, the curved audio waveguide 425 may be integrally formed with the body member 310.

As shown, the curved audio waveguide 425 is disposed away from the substantially conical portion of the body member 310. In this way, the curved audio waveguide 425 does not affect the optical properties of the presentation device 420 and the three-dimensional illusion appears as desired within the body member 310.

Although not illustrated, the curved audio waveguide 425 may be further configured to receive input audio from the user (e.g., input audio 126 of FIG. 1) through the opening 438. The curved audio waveguide 425 may direct the input audio to exit the body member 310 through the second opening 320-2. The exiting input audio may then be directed, e.g., toward a microphone of a user device.

Further, the curved audio waveguide 425 may have any alternate shape that is suitable for directing audio in either direction through the body member 310. Beneficially, the use of the audio directing member 430 allows output audio to be enhanced (or better distinguished) over background noise when presented to one or more users, and/or allows input audio to be enhanced over background noise when received from the one or more users.

Next, the presentation device 440 comprises an audio directing member 430 (more specifically, an insert audio waveguide 445) disposed at the first opening 320-1. The output audio 114 is received through the second opening 320-2, propagates through the body member 310, and reflects off the insert audio waveguide 445 as the output audio 124 exits through the first opening 320-1. The output audio 124 may thus be directed to a desired position, such as a predefined viewing position 335.

The insert audio waveguide 445 may comprise any suitable material, including plastic, glass, metal, and the like. In some embodiments, the insert audio waveguide 445 is a separate element from the body member 310 and is removably or rigidly connected with the body member 310 through any suitable means. In other embodiments, the insert audio waveguide 445 may be integrally formed with the body member 310.

In some embodiments, the insert audio waveguide 445 may extend partly through the first opening 320-1 into the body member 310. The insert audio waveguide 445 may be supported within the body member 310 by one or more support members (not shown). For example, a plurality of support members may be distributed around a circumference of the insert audio waveguide 445, and each support member may extend radially from the insert audio waveguide 445. Other arrangements of the one or more support members are also possible, consistent with the ability for audio to propagate through the body member 310 and to exit through the opening 320-1.

Although not illustrated, the insert audio waveguide 445 may be further configured to reflect input audio from the user (e.g., input audio 126 of FIG. 1) into the body member 310 through the opening 320-1. The insert audio waveguide 445 may further direct the input audio to exit the body member 310 through the second opening 320-2. The exiting input audio may then be directed, e.g., toward a microphone of a user device.

Next, the presentation device 460 defines the second opening 320-2 at one end of the body member 310, and further defines a plurality of openings 320-3, 320-4, 320-5, 320-6 that are distributed around a circumference of the body member 310. The plurality of openings 320-3, 320-4, 320-5, 320-6 may be dimensioned and/or disposed on the body member 310 such that three-dimensional illusions may still be displayed within the body member 310 with an acceptable level of distortion (or with substantially no distortion).

Instead of having the first opening 320-1 disposed at the other end of the body member 310, the presentation device 460 comprises a closed face 465. The output audio 114 is received through the second opening 320-2, propagates through the body member 310, and output audio 124 exits through the plurality of openings 320-3, 320-4, 320-5, 320-6. The output audio 124 may thus be directed to a desired position, such as a predefined viewing position 335.

Figure 5B:
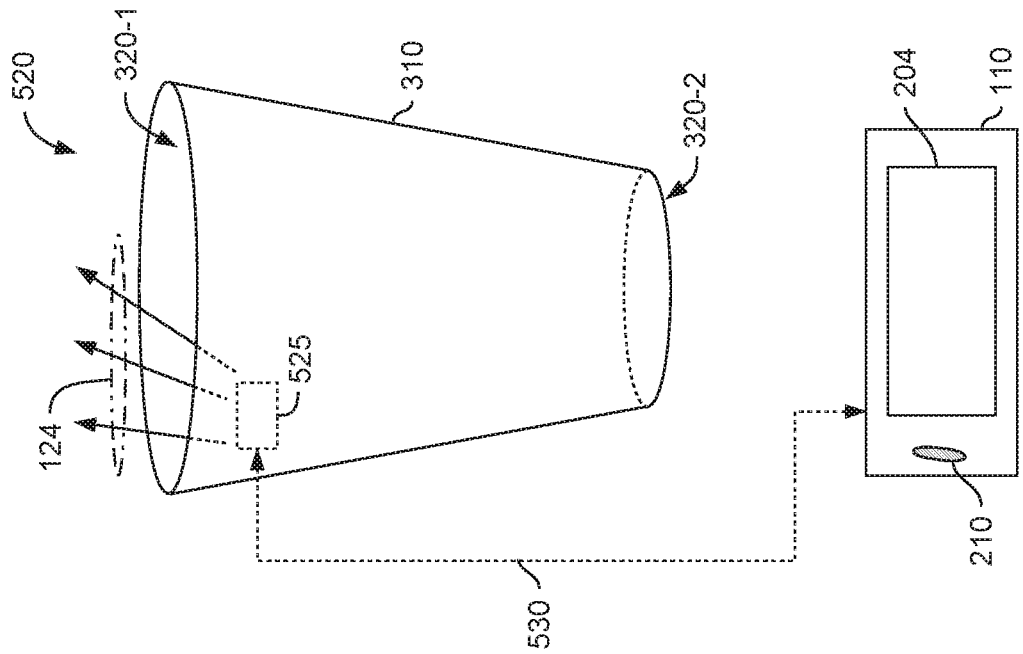
FIG. 5B illustrates an exemplary presentation device comprising electronic circuitry, according to one or more embodiments.
Figure 5A:
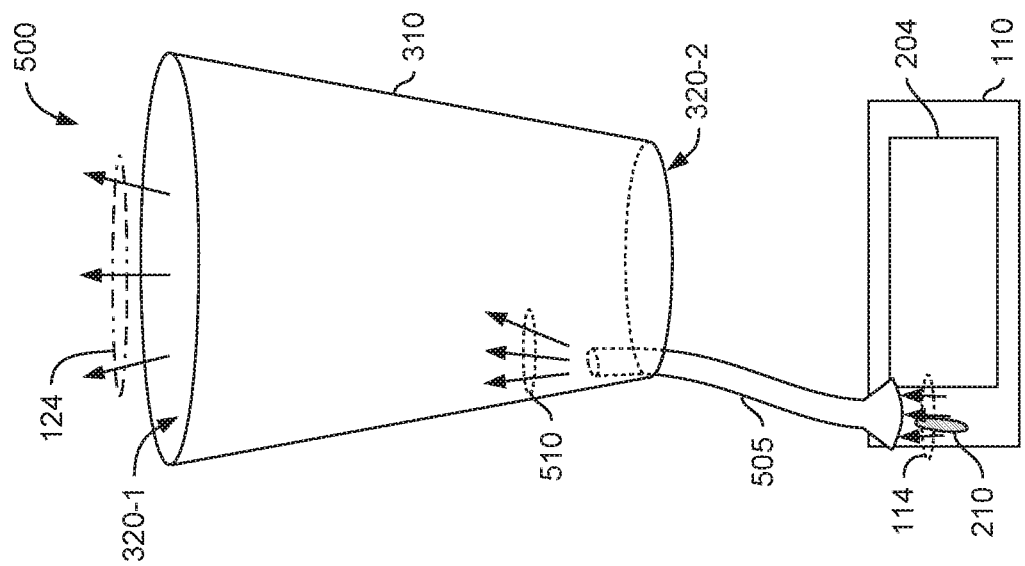
FIG. 5A illustrates an exemplary presentation device comprising an audio guide member, according to one or more embodiments.

FIG. 5A illustrates an exemplary presentation device 500 comprising an audio guide member 505. The presentation device 500 is configured to display three-dimensional illusions within the body member 310, as discussed above with respect to FIG. 3. The presentation device 500 may also include features described in other embodiments, such as the audio direction techniques discussed with respect to FIGS. 4A-4D.

The audio guide member 505 extends from the second opening 320-2 toward an audio output (e.g., a speaker 210 of the user device 110). In some cases, the audio guide member 505 extends through the second opening 320-2 into the interior volume of the body member 310. In other embodiments, the audio guide member 505 may connect with the body member 310 in an alternate location.

The audio guide member 505 may comprise any suitable material(s) and may have any suitable shape for conducting audio therealong. For example, the audio guide member 505 may be substantially tubular and configured to conduct audio through the interior volume of the audio guide member 505. The audio guide member 505 may be rigid or flexible. Further, the audio guide member 505 may include one or more features for improving an audio coupling with the audio output. For example, the audio guide member 505 may include a flared (wider) base portion, or may include a contoured base portion corresponding to a shape and/or dimensions of the audio output.

Output audio 114 is received through the audio guide member 505 and exits the audio guide member 505 into the body member 310, and exits through the first opening 320-1 as output audio 124. As discussed above, the output audio 124 may be alternately directed out of the body member 310 using a curved audio waveguide 425 (FIG. 4B), an insert audio waveguide 445 (FIG. 4C), or through a plurality of openings 320-3, 320-4, 320-5, 320-6 disposed around the body member 310 (FIG. 4D).

FIG. 5B illustrates an exemplary presentation device 520 comprising electronic circuitry 525. The presentation device 520 is configured to display three-dimensional illusions within the body member 310, as discussed above with respect to FIG. 3. The presentation device 520 may include features described in other embodiments, such as the audio direction techniques discussed with respect to FIGS. 4A-4D.

The electronic circuitry 525 is configured to communicate with the user device 110 using a wireless link 530. The electronic circuitry 525 may include transmitter and/or receiver hardware, as well as one or more computer processors. The electronic circuitry 525 may further comprise an audio input device (such as a microphone) and/or an audio output device (such as a speaker). The electronic circuitry 525 may be dimensioned and/or disposed on the body member 310 such that three-dimensional illusions may still be displayed within the body member 310 with an acceptable level of distortion (or with substantially no distortion).

The user device 110 communicates an audio output signal via the wireless link 530 to the electronic circuitry 525. The electronic circuitry 525 processes the audio signal and generates output audio 124 that exits the opening 320-1 of the body member 310. As discussed above, the output audio 124 may be alternately directed out of the body member 310 using a curved audio waveguide 425 (FIG. 4B), an insert audio waveguide 445 (FIG. 4C), or through a plurality of openings 320-3, 320-4, 320-5, 320-6 disposed around the body member 310 (FIG. 4D).

Figure 6A:
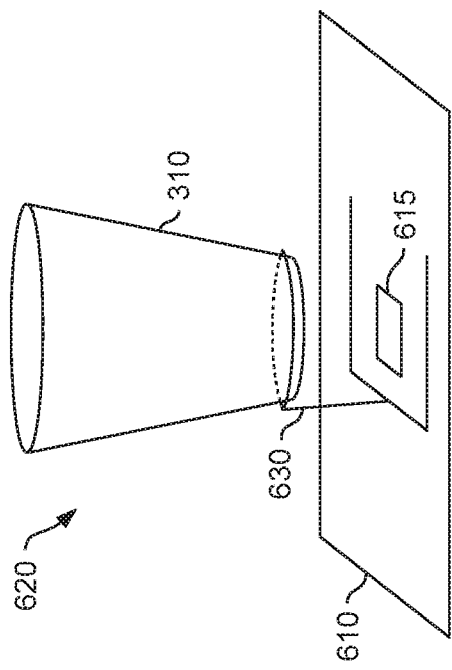
FIG. 6A illustrates an exemplary presentation device comprising a base member coupled with the body member, according to one or more embodiments.

FIG. 6A illustrates an exemplary presentation device 600 comprising a base member 605 coupled with the body member 310. The presentation device 600 is configured to display three-dimensional illusions within the body member 310, as discussed above with respect to FIG. 3. The presentation device 600 may also include features described in other embodiments, such as the audio direction techniques discussed with respect to FIGS. 4A-4D.

In some embodiments, the base member 605 may be used to provide the body member 310 and a display 615 with a predefined arrangement, such that anamorphically imagery displayed by the display 615 may be reconstituted as a three-dimensional illusion within the body member 310. In some embodiments, the base member 605 provides the body member 310 with a predefined arrangement relative to a reference surface 610. The display 615 may also have a predefined arrangement relative to the reference surface 610.

The display 615 represents a display device or a portion thereof. The display 615 may be implemented in any suitable form, such as a display integrated in a mobile computing device, or a separate display device communicatively coupled with a computing device.

In some embodiments, the reference surface 610 comprises an external surface such as a top surface of a table, a counter, a desk, etc. In such a case, the display 615 may represent a mobile computing device (such as a smart phone or tablet) placed onto the reference surface 610, and the base member 605 may also be placed onto the reference surface 610. In other embodiments, the reference surface 610 comprises a surface of the display 615 or an associated mobile computing device. In such a case, the base member 605 may be placed onto the mobile computing device. In yet other embodiments, the base member 605 defines the reference surface 610.

The base member 605 may be formed of any material(s) suitable for rigidly supporting the weight of body member 310. Additionally, the base member 605 may be implemented with any suitable dimensions and form. In one non-limiting example, and as shown in FIG. 6A, the base member 605 has a substantially frustroconical shape and interfaces at a first end with the body member 310 and interfaces at an opposite, second end with the reference surface 610. The first end and/or second end may define openings through which imagery from the display 615 is transmitted into the body member 310. Other configurations of the base member 605 suitable for transmitting imagery and/or audio into the body member 310 are also contemplated.

Figure 6B:
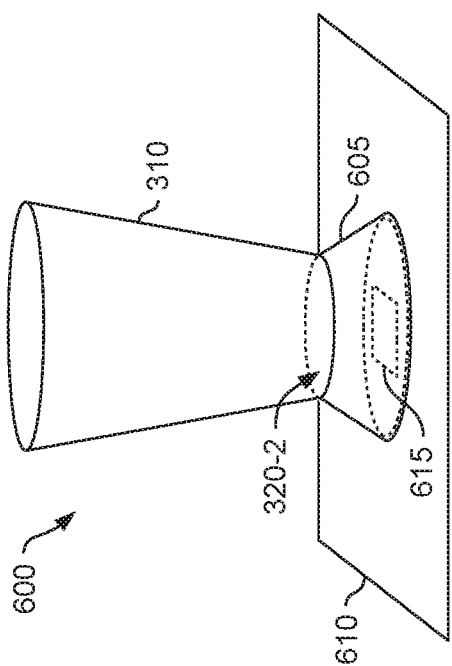
FIG. 6B illustrates an exemplary presentation device comprising a base member and a support member extending between the base member and the body member, according to one or more embodiments.

FIG. 6B illustrates an exemplary presentation device 620 comprising a base member 625 and a support member 630 extending between the base member 625 and the body member 310. The presentation device 620 is configured to display three-dimensional illusions within the body member 310, as discussed above with respect to FIG. 3. The presentation device 620 may also include features described in other embodiments, such as the audio direction techniques discussed with respect to FIGS. 4A-4D.

The base member 625 may be used to provide the body member 310 and a display 615 with the predefined arrangement for producing the three-dimensional illusion within the body member 310. The base member 625 and the support member 630 may be formed of any material(s) suitable for rigidly supporting the weight of body member 310. The support member 630 may interface in any suitable manner with the body member 310. In one non-limiting example, and as shown, the body member 310 extends partially through the support member 630, such that the support member 630 supports the body member 310 by engaging external surface(s) of the body member 310. In another non-limiting example, the body member 310 may be placed atop the support member 630.

Figure 6C:
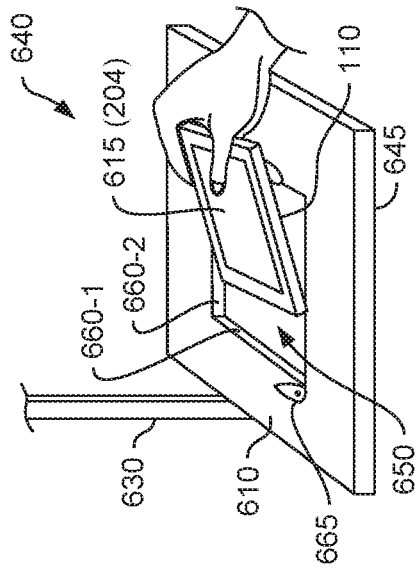
FIG. 6C illustrates an exemplary presentation device comprising a base member having one or more alignment features and one or more retaining features, according to one or more embodiments.

FIG. 6C illustrates an exemplary presentation device 640 comprising a base member 645 having one or more alignment features 660-1, 660-2 and one or more retaining features 665. The base member 645 couples with the body member 310 (not illustrated) through the support member 630. The base member 645 defines an opening 650 into which a mobile computing device (such as user device 110) may be removably inserted. When the mobile computing device is inserted into the base member 645, the display 615 (display 204 of the user device 110) has a predefined arrangement with the reference surface 610 and/or the body member 310. A surface of the user device 110 may be substantially coplanar with the reference surface 610, but non-coplanar implementations are also contemplated.

As shown, one or more sidewalls of the base member 645 define the opening 650. In some embodiments, a first sidewall may act as a first alignment feature 660-1 along one dimension, and a second sidewall may act as a second alignment feature 660-2 along a second dimension. The alignment features 660-1, 660-2 are configured to arrange the mobile computing device relative to the reference surface 610 and/or to the body member 310. Other implementations of alignment features are also possible, such as a slot or carrier into which the mobile computing device may be removably inserted to provide the predefined arrangement of the display 615 and the body member 310.

The base member 645 may further define one or more retention features 665 for retaining the mobile computing device in the predefined arrangement. In one non-limiting example of the retention feature 665, and as shown, a rotatable tab may be rotated from a non-retaining position into a retaining position that overlaps with the opening 650. When in the retaining position, the rotatable tab may apply pressure to the (inserted) mobile computing device or may otherwise limit movement of the mobile computing device. Other implementations of retention features are also possible.

Although not explicitly shown in FIGS. 6A-6C, in some embodiments the base members 605, 625, and/or 645 may be implemented as a docking device that provides one or more electrical connections with the mobile computing device. For example, the one or more electrical connections may be used for conductive or wireless (e.g., inductive) charging of the mobile computing device, and/or for conductive or wireless data communication.

Figure 7:
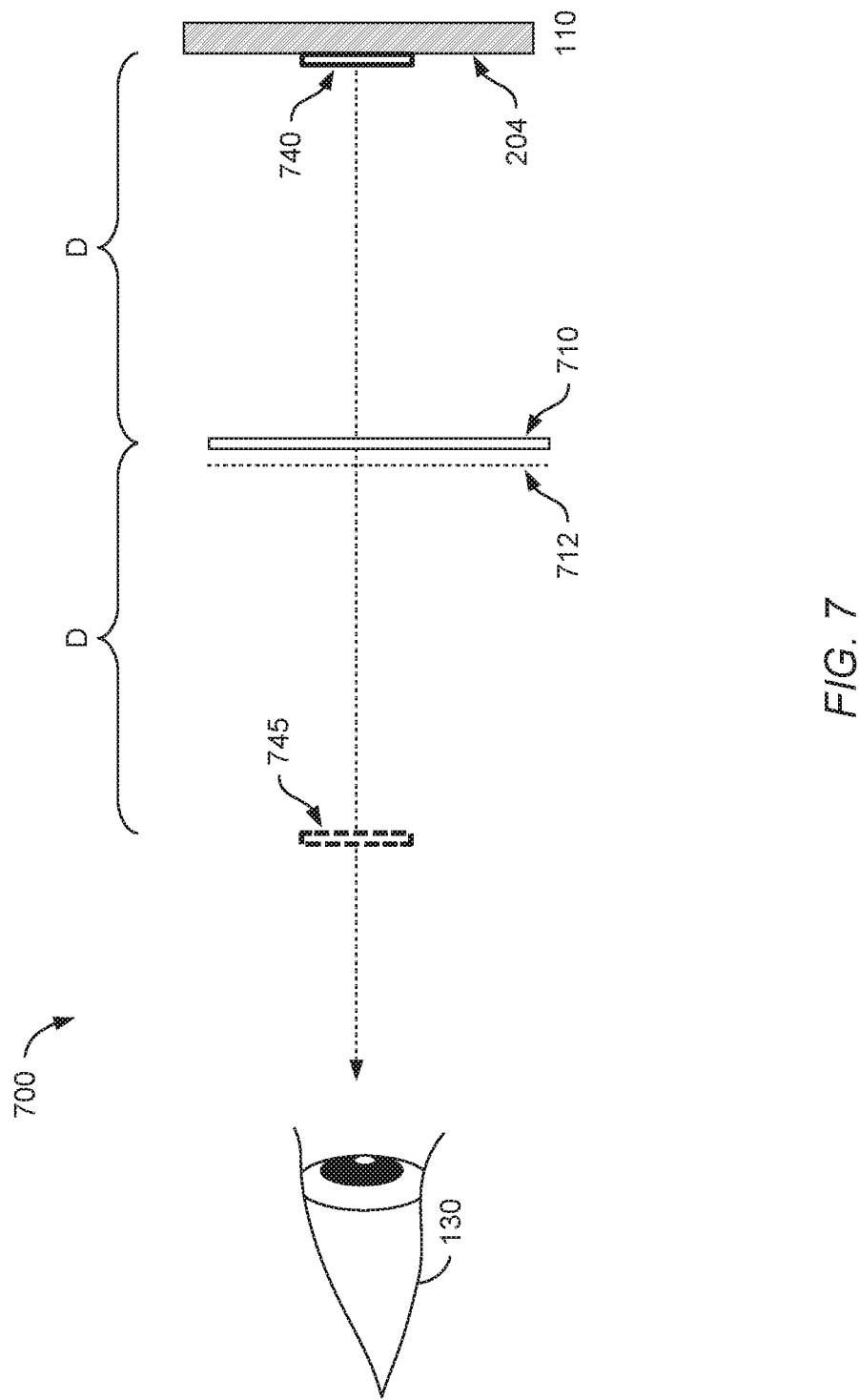
FIG. 7 illustrates an example optical configuration to generate the illusion of a three-dimensional floating image to one or more users, according to one or more embodiments.

FIG. 7 illustrates another example optical configuration 700 to generate the illusion of a three-dimensional floating image to one or more users. In this configuration, the user device 110 is placed at a distance D from a Fresnel lens 710. The imagery shown on the display 204 of the user device 110, for example imagery 740, is transmitted through the Fresnel lens 710 and generates a real image 745, which is visible to the user 130 as a three dimensional illusion. In one embodiment, D is two focal lengths, and the display 204 of the user device 110 is placed two focal lengths from the principal plane of the Fresnel lens 710. Placing the display 204, and imagery 740, two focal lengths from the principal plane of the Fresnel lens 710 creates an inverted real image 745 with unity magnification two focal lengths from the Fresnel lens 710. Described another way, the image 745 that is visible to the user 130 is inverted, but is not magnified. Operating at a unity conjugate, like unity magnification, minimizes any aberration and distortion of the imagery.

To generate the illusion of a three-dimensional floating image, the Fresnel lens 710 can be hidden. For example, a scrim 712 can be placed between the Fresnel lens 710 and the user 130. The scrim 712 can be a gauze or other material that allows light from the displayed imagery to pass but effectively obscures the presence of the Fresnel lens 710 to the user 130. The scrim 712 allows light to pass through, conveying imagery from the display 204 to the user 130, but appears solid to the user. A pattern or moving image can be placed on the front of the scrim 712, facing the user 130, to enhance the illusion. Further, one or more objects can be placed near the image source. For example, a ring of lights placed near the display 204 would also be seen by the user 130 and can further enhance the illusion. The optical configuration 700 requires relatively few optical components, making it inexpensive to manufacture and generally not prone to errors and inconsistencies.

Figure 8:
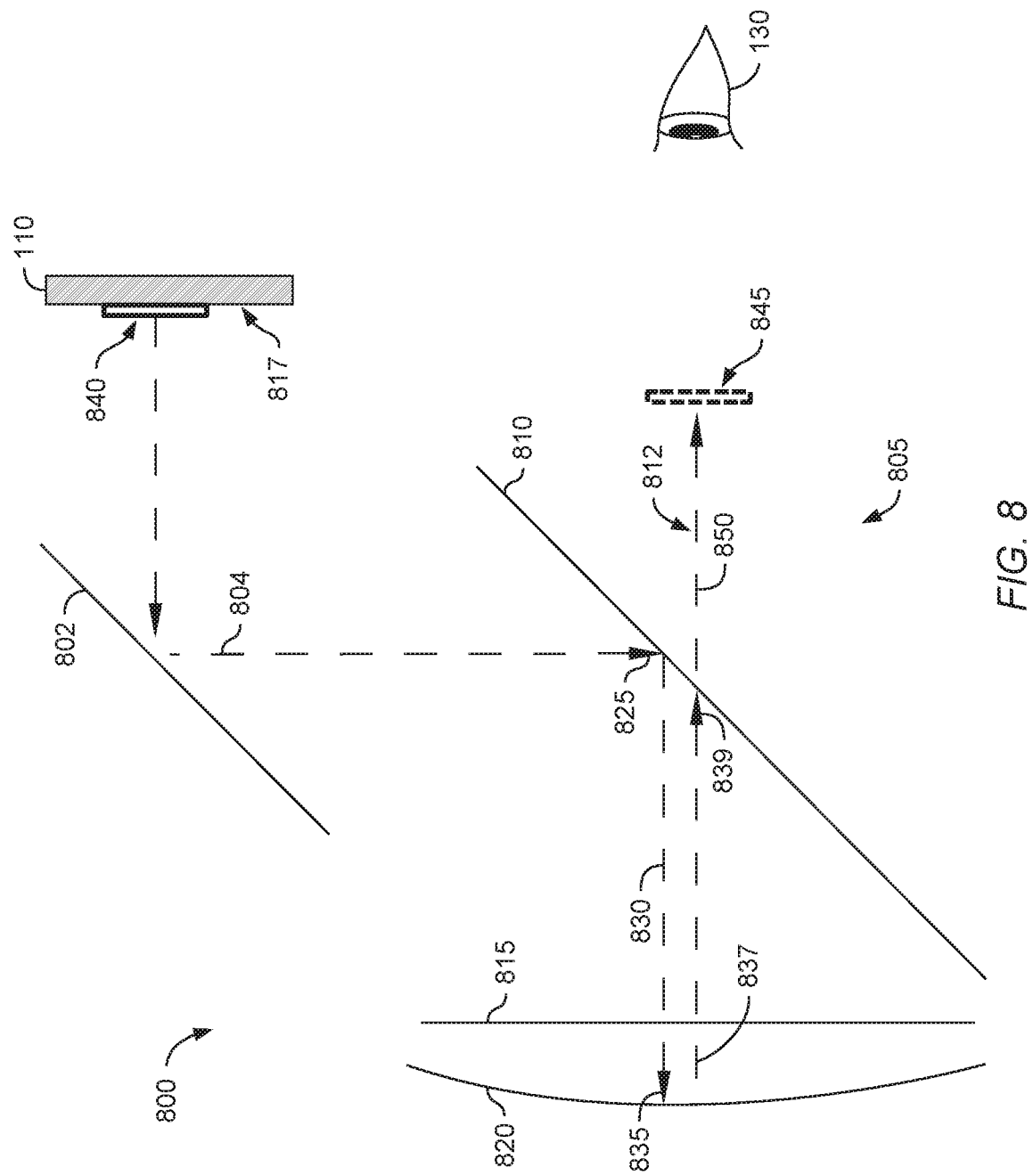
FIG. 8 illustrates an example optical configuration to generate the illusion of a three-dimensional floating image to one or more users, according to one or more embodiments.

FIG. 8 illustrates another example optical configuration 800 to generate the illusion of a three-dimensional floating image to one or more users. In the optical configuration 800, the user device 110 includes a polarized display 817 generating imagery that is linearly polarized (whether in s-polarization or p-polarization), and the optical arrangement 805 includes a polarized beam splitter element 810 having a polarization axis aligned with the linearly polarized light 804. The optical arrangement 805 further comprises a quarter-wave plate element 815 having a vertical orientation (as shown) and disposed between the polarized beam splitter element 810 and a mirror element 820.

The polarized display 817 may be placed a distance D from the focal point of the optical configuration 805. In one embodiment, the polarized display 817 can be operating at a unity conjugate from the optical configuration 805. For example, the polarized display 817 can be placed so that the distance D is two focal lengths. With the components of optical arrangement 805, discussed in further detail below, this creates a real image 845 that acts as a three dimensional illusion of imagery 840 and appears to be floating in front of an eye of the user 130.

The optical arrangement 805 defines a first optical path 812. Light generated by the polarized display 817, including imagery 840, is reflected by a mirror element 802. The reflected light propagates along path 804 toward the polarized beam splitter element 810. The light is then reflected by the polarized beam splitter element 810, along path 830, through the quarter-wave plate element 815, to a surface of the mirror element 820, which is then reflected toward the user 130 through the quarter-wave plate element 815, and through the polarized beam splitter element 810. Real image 845 is generated and appears as a three dimensional illusion to the user 130.

Describing the first optical path 812 defined by the optical arrangement 805 in another way, the polarized beam splitter element 810 with the series combination of the quarter-wave plate element 815 and the mirror element 820 are arranged such that most of the first incident light 825 having a first polarization is reflected by the polarized beam splitter element 810 (as second portion 830), and most of the third incident light 839 having a second polarization (e.g., a 90°-rotated polarization from the polarization axis of the beam splitter element 810) is transmitted by the polarized beam splitter element 810 (as third portion 850). In this way, losses are reduced at each incidence of the light on the polarized beam splitter element 810.

Generally, although the mirror element 820 has a positive optical power, the mirror element 820 does not distort or refocus the imagery as the thickness of the mirror element 820 is consistent. In other words, the mirror element 820 has a reflective optical power but does not have a refractive optical power. In one alternate embodiment, the mirror element 820 is polarized in order to further increase the amount of light reflected (i.e., the second portion 837) toward the polarized beam splitter element 810 and ultimately transmitted to the viewer.

Traditional beam splitter elements and partially reflective mirror elements pass only a percentage of incident light and reflect substantially the complementary percentage (i.e., transmitted light=100%−reflected light) of the incident light. For example, in a 50/50 beam splitter, half of the incident light is transmitted through the beam splitter while the other half is reflected. Such partially reflective surfaces lose a significant amount of energy with each reflection. For example, if light emitted by a display is reflected twice by 50% partially-mirrored surfaces, and transmitted once through a 50% partially-reflective beam splitter, approximately seven-eighths (⅞ or 87.5%) of the emitted light is lost and approximately one-eighth (⅛ or 12.5%) of the emitted light is transmitted to the viewer's eye 130.

When the light emitted by a display is polarized, e.g., an LCD or an OLED display including a polarizer to reduce scatter and glare, it is possible to greatly increase the amount of light that reaches the viewer's eye by substituting the polarized beam splitter element 810 (e.g., a planar reflector) for a partially-reflective mirror beam splitter, and by including the quarter-wave plate element 815 between the polarized beam splitter element 810 and the mirror element 820 (e.g., partially reflective and concave). For example, for the polarized display 817 of FIG. 8, the emitted polarized light undergoes two quarter-phase shifts and one reflection, ultimately rotating the plane of polarization 90° so that the majority of light reflected from the mirror element 820 will pass through the polarized beam splitter element 810 to the eye of the user 130. However, because this method employs a partially-reflective mirror coating on the mirror element 820, a fraction of the emitted polarized light is still lost in proportion to the transmittance of this surface of the mirror element 820.

In some embodiments, a polarized reflective coating is applied to the front surface of the mirror element 820 to form a polarized reflector. Some non-limiting examples of the polarized reflector include a wire grid polarizer, interference polarizer, stack polarizer, or other reflective polarizer. The plane of polarization of the polarized reflector is oriented 90° with respect to the plane of polarization of the polarized beam splitter element 810.

The quarter-wave plate element 815 is disposed between the polarized beam splitter element 810 and the polarized reflector. Polarized light emitted by the polarized display 817 is efficiently reflected by the polarized beam splitter element 810, and the polarization is rotated via the quarter-wave plate element 815, such that the majority of light reflected by the polarized beam splitter element 810 on the first pass is returned with a 90° polarization shift and efficiently transmitted through the polarized beam splitter element 810 on the second pass to the eye of the user 130. This efficiency results as the plane of polarization of light 830 from the polarized display 817, after the reflection off the polarized beam splitter element 810 and two passes through the quarter-wave plate element 815, will have been oriented along the plane of maximum transmission for the polarizing beam splitter element 810.

Additionally, plane-polarized light emitted from the polarized display 817 that is reflected at a first pass of the polarized beam splitter element 810 has its polarization altered by the quarter-wave plate element 815. As a result, a greater proportion of the plane-polarized light will be reflected by the plane-polarized concave polarized reflector formed using the mirror element 820, as the polarized reflector has a plane of polarization orthogonal to that of the polarized beam splitter 810. The optical configuration 800 can therefore recover a substantial portion of the light that would otherwise be lost when light reflected from the polarized beam splitter element 810 (i.e., second portion 830) is incident on the mirror element 820.

For some types of polarized reflectors, it is possible to achieve increased brightness without requiring a separate quarter-wave plate element 815 to be disposed between the polarized beam splitter element 810 and the mirror element 820. For example, in a polarized reflector that uses a stack of quarter-wave elements having an alternating high index-low index pattern, the outermost quarter-wave element in the stack can act as a polarization rotator for the purpose of brightness enhancement. In this case, an optical axis of the stack of quarter-wave elements is oriented such that the stack optimally rotates the plane of polarization of incident light, which is subsequently reflected by the mirror element 820, such that a maximum amount of incident light is reflected by the mirror element 820 while increasing a percentage of background light that is transmitted through the mirror element 820.

Figure 9:
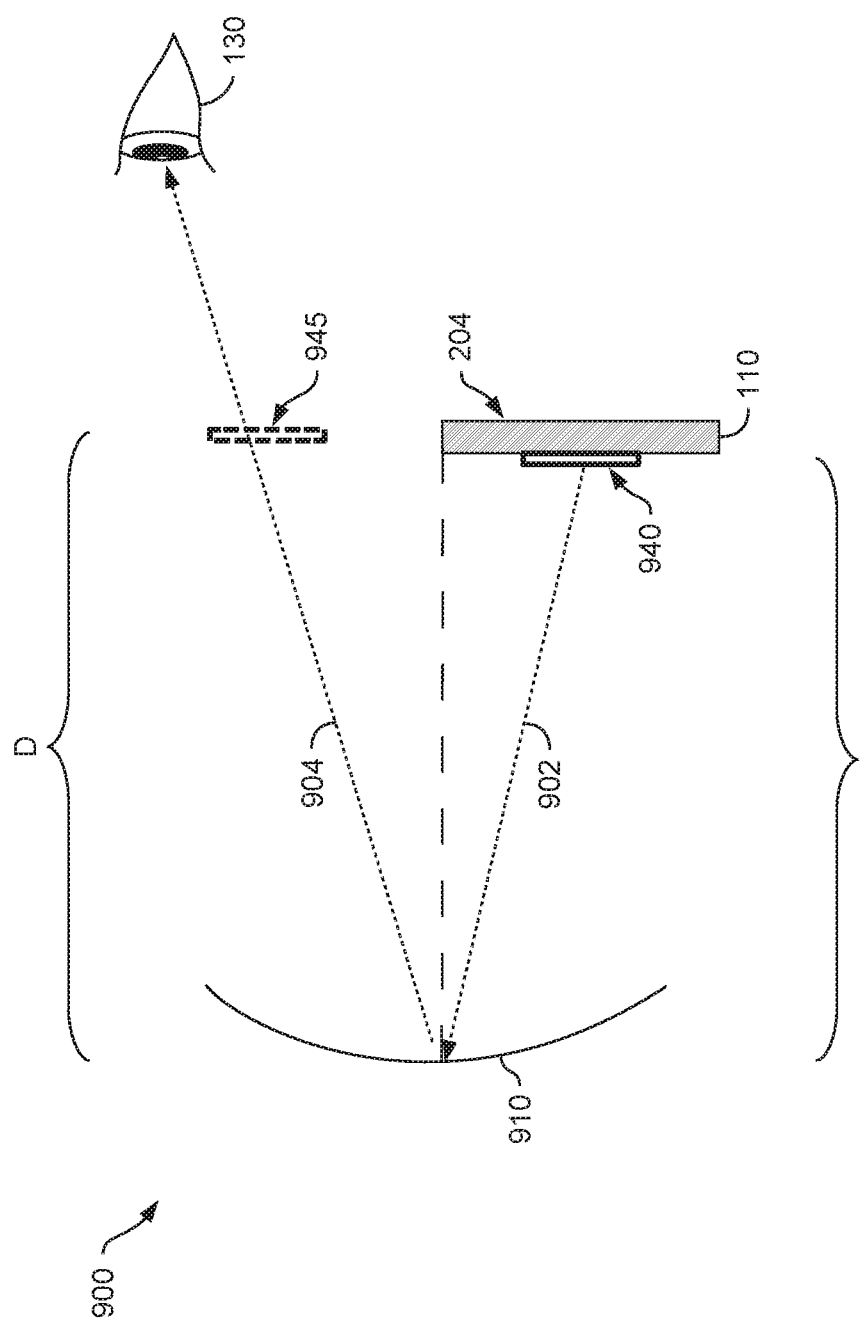
FIG. 9 illustrates an example optical configuration to generate the illusion of a three-dimensional floating image to one or more users, according to one or more embodiments.

FIG. 9 illustrates another example optical configuration 900 to generate the illusion of a three-dimensional floating image to one or more users. In the optical configuration 900, the user device 110, with display 204 displaying imagery 940, is placed so that it creates an off-axis reflection from a mirror element 910. For example, the display 204 of the user device 110 could be placed so that the base of the display is aligned with the center of the mirror element 910. In some embodiments, the mirror element 910 can be a semi-transparent, beam-splitting concave mirror. For example, the mirror element 910 can be a concave partially silvered mirror.

In some embodiments, the display 204 can be placed a distance D from the mirror element 910. For example, D can be two focal lengths, so that the display 240 is two focal lengths away from the mirror element 910. The imagery 940 from the display 204 propagates along light path 902 to the mirror element 910. The imagery 940 is reflected from the mirror element 910 along light path 904 toward the eye of the user 130. This creates an inverted real image 945 at a distance D from the mirror element, which acts as the three dimensional illusion of the imagery 940 to the user 130.

Like the optical configuration 700 discussed with regard to FIG. 7, it may be desirable to obscure the mirror element 910 and the user device 110 to enhance the illusion. For example, a scrim (similar to the scrim 712 of FIG. 7) may be placed between the mirror element 910 and the user 130. The scrim can be a gauze or other material that allows light from the displayed imagery to pass but effective obscures the presence of the mirror element 910 to the user 130. The scrim allows light to pass through, conveying imagery from the display 204 to the user 130, but appears solid to the user 130. A pattern or moving image can be placed on the front of the scrim, facing the user 130, to enhance the illusion. Further, one or more objects can be placed near the image source. For example, a ring of lights placed near the display 204 would also be seen by the user 130 and can further enhance the illusion.

Figure 10A:
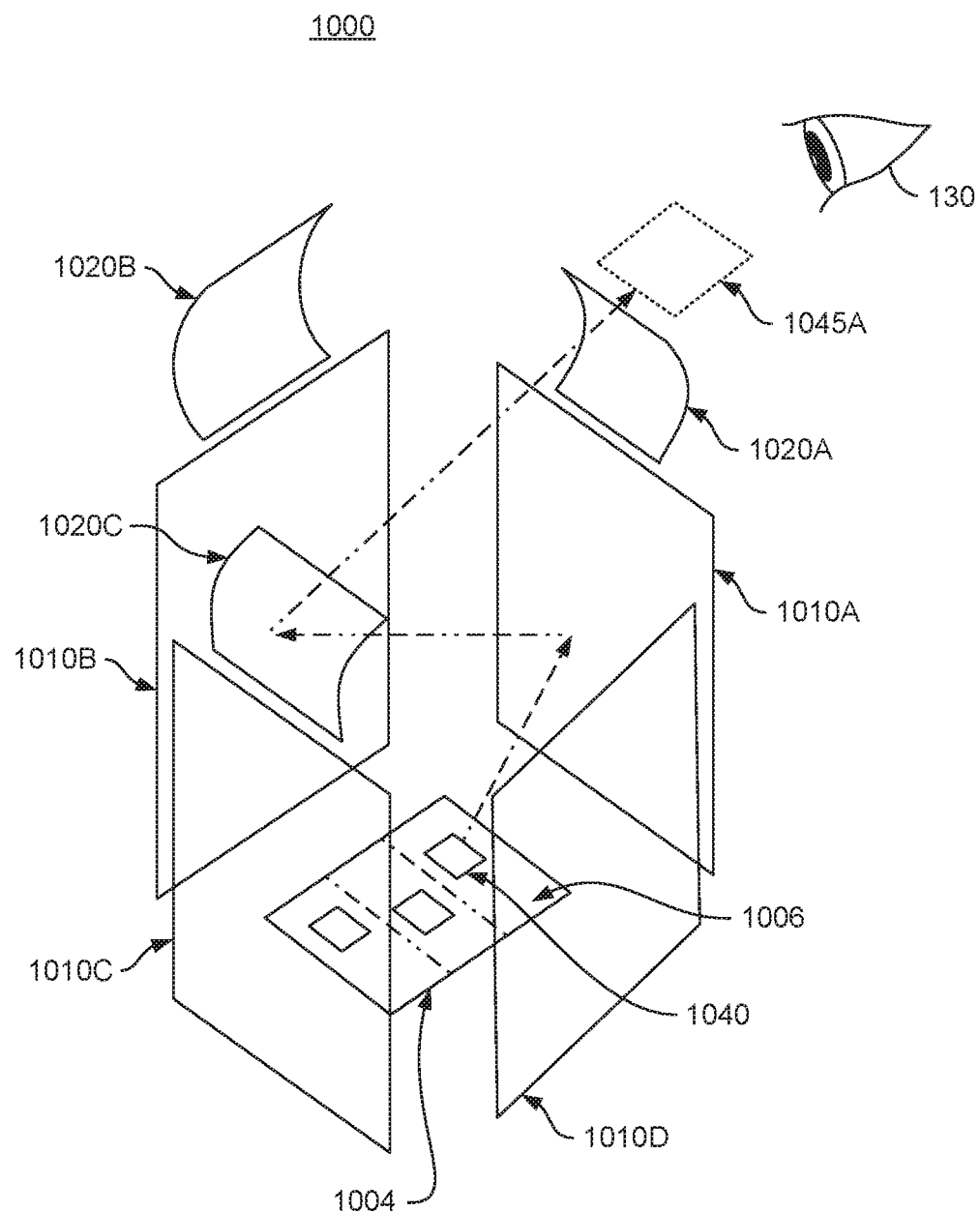
FIGS. 10*a* and 10*b* illustrate an example optical configuration to generate the illusion of a three-dimensional floating image to three users, according to one or more embodiments.
Figure 10B:
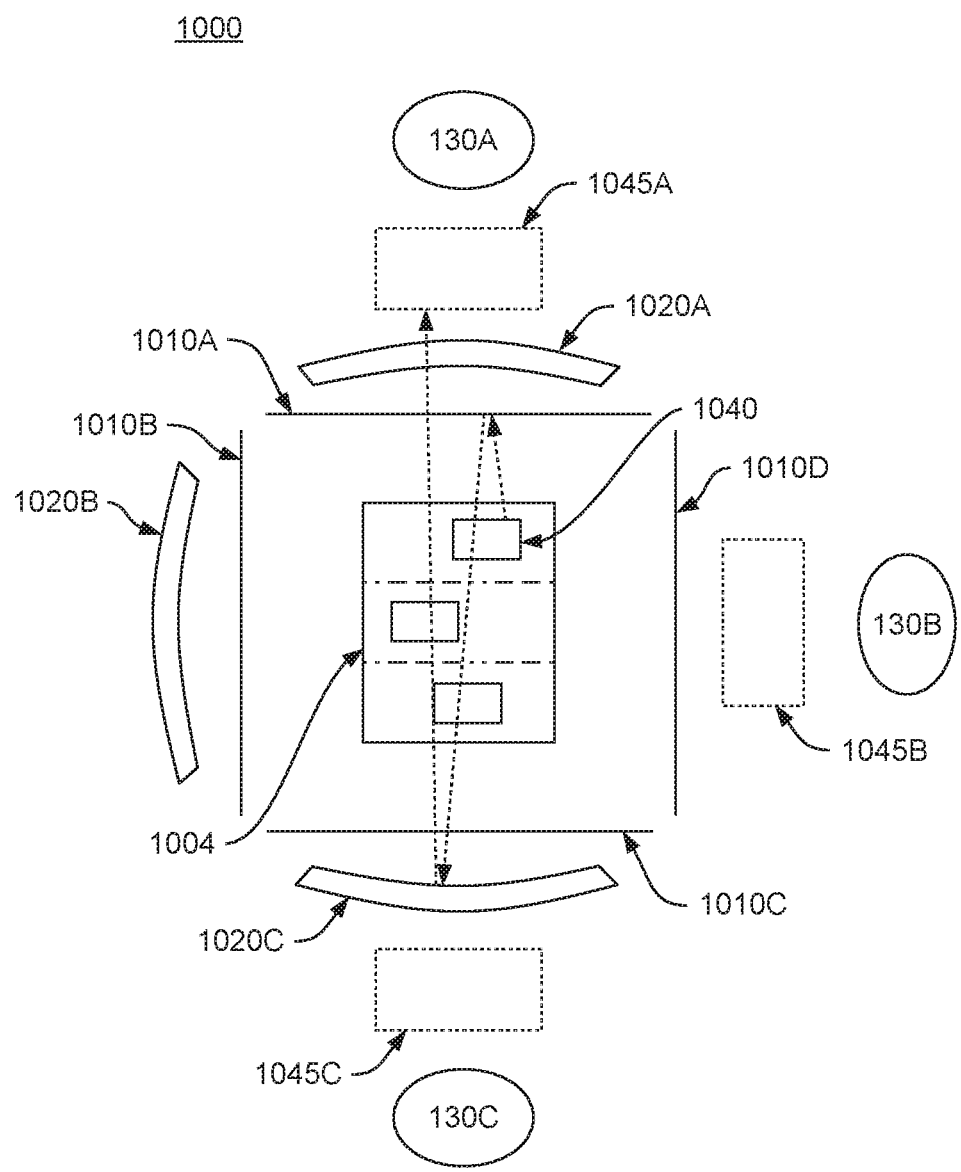

FIGS. 10a and 10b illustrate an example optical configuration to generate the illusion of a three-dimensional floating image to three users, according to one or more embodiments. In some circumstances, multiple uses may wish to view a three-dimensional floating illusion simultaneously. For example, multiple users may wish to view the same three-dimensional illusion, at the same time. In this circumstance, the users may be at widely different viewing angles. FIGS. 10a and 10b illustrate an optical configuration 1000 suitable for viewing by multiple users at the same time, from widely different viewing angles.

FIG. 10a is a three quarter view of the optical configuration 1000. This configuration provides a wide angle real image viewing system, in which three separate views of a display surface are presented. In this example, the three views are oriented approximately 90 degrees from each other. A person of ordinary skill in the art would understand that this configuration could be used for greater, or lesser, angles of separation before the views.

A user device includes a display 1004. Like user device 200 and display 204 discussed above in relation to FIG. 2, the display 1004 can be any suitable display surface, including the display of a smartphone, tablet, personal computer, or any other suitable device. The display is divided into three segments, indicated with the dashed lines. Each segment includes imagery. For example, segment 1006 in FIG. 10a includes imagery 1040. Light from each segment travels to a fold mirror oriented at approximately a 90 degree angle to the surface of the display 1004. For example, light from the segment 1006, including light related to imagery 1040, travels to a fold mirror 1010a.

The light is then directed to a concave mirror 1020c, which includes a nominal focal length F. The optical distance from the segment 1006 of the display 1004 to the concave mirror 1020c is nominally 2F. Light rays from the segment 1006 are reflected and focused by the concave mirror 1020c into a real image 1045a, approximately 2F in distance from the vertex of the concave mirror 1020c. This image 1045a can be perceived by a user 130 as a three dimensional illusion, floating above or near the vicinity of the fold mirror 1010a and the concave mirror 1020a.

Light from the remaining segments of the display 1004 follows similar, but reversed or orthogonal, paths, reflecting from fold mirror 1010d to concave mirror 1020b, and from fold mirror 1010c to concave mirror 1020a. This forms additional real images located above fold mirrors 1010c and 1010d, as can be seen in FIG. 10b.

FIG. 10b illustrates a top-down view of the optical configuration 1000 described in relation to FIG. 10a. Users 130a, 130b, and 130c wish to view the three-dimensional illusion. The display 1004 is divided into segments. Light from each segment is directed to one of the fold mirrors 1010a, 1010b, 1010c, or 1010d, then reflected to a respective concave mirror 1020a, 1020b or 1020c, where it is reflected and focused to form a real image 1045a, 1045b or 1045c, visible to a user 130a, 130b or 130c. For example, light from one segment of display 1004 travels to the fold mirror 1010a. The light is reflected by fold mirror 1010a to the concave mirror 1020c. The light is then reflected and focused by concave mirror 1020c to form a real image 1045a. The real image 1045a appears to be a three-dimensional illusion to the user 130a, floating above the fold mirror 1010a and the concave mirror 1020a. Light from the remaining segments of the display 1004 is similarly reflected by the fold mirrors 1010d and 1010c, respectively, and reflected and focused by the concave mirrors 1020b and 1020a, respectively, to form the real images 1045b and 1045c. The real image 1045b is viewable by the user 130b as a three-dimensional illusion and the real image 1045c is viewable by the user 130c as a three-dimensional illusion.

The optical arrangement 1000, illustrated in FIGS. 10a and 10b, has numerous advantages. For example, three users, spaced widely apart, can each view a three dimensional illusion. In one embodiment, each segment of the display 1004 is identical, so that each user 130a-c sees the same illusion. In another embodiment, the different segments of the display 1004 can render different images. For example, the different segments of the display 1004 can render different views of the same object or scene so that, for example, user 130a perceives a frontal image, user 130b perceives an image of the right side of the object or scene, and user 130c perceives a rear image. This can enhance the illusion that a real object is floating in space and can be seen from different perspectives and different angles.

In the preceding, reference was made to embodiments of the disclosure. However, it should be understood that the disclosure is not limited to specific described embodiments. Instead, any combination of the preceding features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., image generator 232 and/or the distortion shader 234 of FIG. 2) or related data available in the cloud. For example, the image generator 232 and the distortion shader 234 could execute on a computing system in the cloud and generate and anamorphically distort an image. In such a case, the image generator 232 and the distortion shader 234 could store data related to the image and anamorphic distortion at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A presentation device for use with a mobile computing device comprising a display device and an audio output, the presentation device comprising:
    a body member having a first predefined arrangement with a reference surface, the body member defining an interior volume and at least a first opening, the body member comprising a partially reflective and partially transmissive medium, wherein the body member is configured to:
        receive, when the mobile computing device has a second predefined arrangement with the reference surface, anamorphically-distorted imagery that is displayed by the display device;
        reconstitute the anamorphically-distorted imagery as a three-dimensional illusion that appears within the interior volume; and
        guide audio from the audio output to exit the body member through the first opening.

2. The presentation device of claim 1, further comprising an audio directing member disposed at the first opening.

3. The presentation device of claim 2, wherein the audio directing member is configured to direct audio toward a predefined viewing position for viewing the three-dimensional illusion.

4. The presentation device of claim 1, wherein the first opening is arranged at a first end of the body member, the body member further comprising a second opening arranged at a second end of the body member opposite the first end, and wherein the body member is further configured to receive audio from the audio output through the second opening.

5. The presentation device of claim 4, further comprising an audio guide member extending from the second opening toward the audio output.

6. The presentation device of claim 1, wherein the body member has a shape that is substantially cylindrical or substantially conical, and wherein the first opening is arranged at a face of the body member.

7. The presentation device of claim 1, wherein the body member is further configured to receive audio through the first opening and to direct the received audio through a second opening.

8. A presentation device for use with a mobile computing device, the presentation device comprising:
    a body member having a first predefined arrangement with a reference surface, the body member defining an interior volume, the body member comprising a partially reflective and partially transmissive medium, wherein the body member is configured to:
        receive, when the mobile computing device has a second predefined arrangement with the reference surface, anamorphically-distorted imagery that is displayed by a display device of the mobile computing device; and
        reconstitute the anamorphically-distorted imagery as a three-dimensional illusion that appears within the interior volume.

9. The presentation device of claim 8, further comprising:
a base member defining the reference surface; and
a support member extending between the base member and the body member.

10. The presentation device of claim 9, wherein the base member defines one or more alignment features for arranging the mobile computing device relative to the reference surface.

11. The presentation device of claim 9, wherein the base member defines one or more retention features for retaining the mobile computing device in the second predefined arrangement with the reference surface.

12. The presentation device of claim 8, wherein the body member further defines a first opening, the body member configured to guide audio from the mobile computing device through the first opening.

13. The presentation device of claim 12, wherein the first opening is arranged at a first end of the body member, the body member further comprising a second opening arranged at a second end of the body member opposite the first end, the body member further configured to receive audio from the audio output through the second opening.

14. The presentation device of claim 13, further comprising: an audio guide member extending from the second opening toward the audio output.

15. The presentation device of claim 12, further comprising an audio directing member disposed at the first opening.

16. The presentation device of claim 15, wherein the audio directing member is configured to direct audio toward a predefined viewing position for viewing the three-dimensional illusion.

17. A presentation device comprising:
a mobile computing device configured to display anamorphically-distorted imagery; and
a body member having a first predefined arrangement with a reference surface, the body member defining an interior volume and a first opening, the body member comprising a partially reflective and partially transmissive medium, wherein the body member is configured to:
using the anamorphically-distorted imagery, when the mobile computing device has a second predefined arrangement with the reference surface, display a three-dimensional illusion appearing within the interior volume; and
guide audio from an audio device through the first opening.

18. The presentation device of claim 17, further comprising an audio directing member disposed at the first opening, the audio directing member configured to direct audio toward a predefined viewing position for viewing the three-dimensional illusion.

19. The presentation device of claim 17, wherein the first opening is arranged at a first end of the body member, the body member further comprising a second opening arranged at a second end of the body member opposite the first end, and wherein the body member is further configured to receive audio from the audio output through the second opening.

20. The presentation device of claim 19, further comprising an audio guide member extending from the second opening toward the audio output.

* * * * *